No. 859,427. PATENTED JULY 9, 1907.
F. BRANDENBURG.
PROCESS OF PURIFYING GAS.
APPLICATION FILED MAR. 19, 1907.
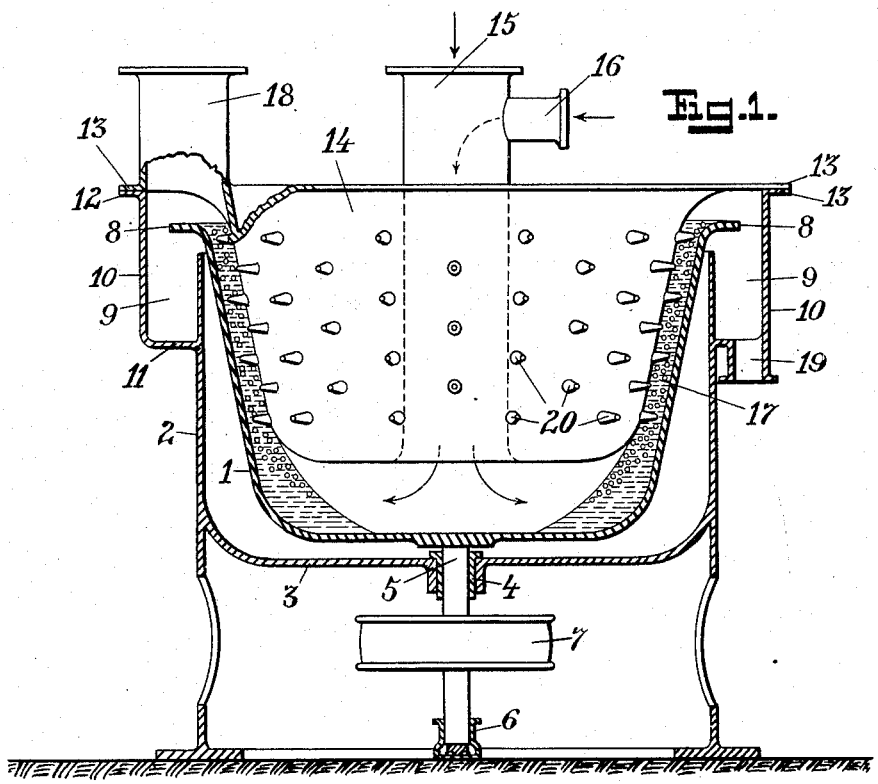
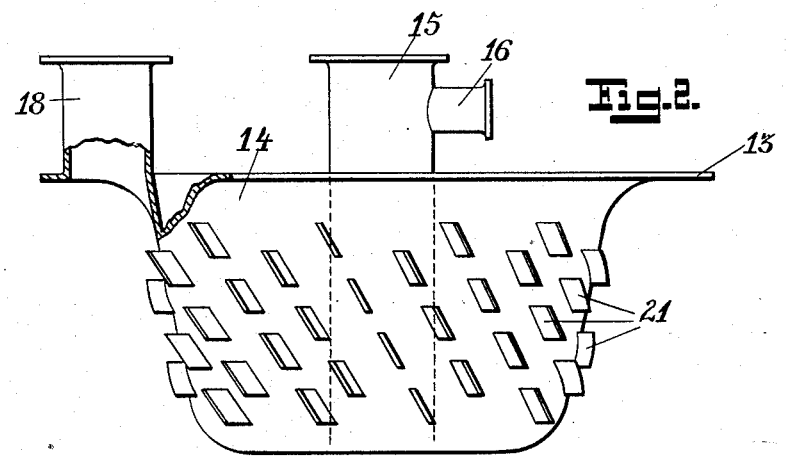
Witnesses:
F. G. Harder.
A. Frank.
Inventor:
Franz Brandenburg
per Martin Schmetz
Attorney.

UNITED STATES PATENT OFFICE.

FRANZ BRANDENBURG, OF LENDERSDORF, GERMANY.

PROCESS OF PURIFYING GAS.

No. 859,427.

Specification of Letters Patent.

Patented July 9, 1907.

Application filed March 19, 1907. Serial No. 363,248.

*To all whom it may concern:*

Be it known that I, FRANZ BRANDENBURG, engineer, a subject of the King of Prussia, residing at Lendersdorf, near Dueren, Rhenish Prussia, in the Kingdom of Prussia, Empire of Germany, have invented certain new and useful Improvements in Processes for Absorbing, Condensing, or Purifying Gases; and I do hereby declare the following to be a full, clear, and exact description of the invention, such as will enable others skilled in the art to which it appertains to make and use the same.

My present invention relates to a process for absorbing, condensing or purifying gases, according to which the gases are introduced into, respectively passed through a ring of liquid kept in suspension by centrifugal force, in order to offer no hydrostatic pressure to the rising gases or to reduce said pressure at least to a minimum.

The present process is based upon the principle, that when water or a pulpy liquid are introduced into a rotating cylindrical or conical vessel closed at the bottom, the contents of such vessel will rise along the walls thereof, whereas the bottom will become uncovered. During this action the liquid assumes the shape of a suspended and rotating ring. If in this rotating vessel a stationary, *i. e.* an unmovable cylindric vessel, is inserted in such a manner, that the walls of the rotating vessel are kept equidistant and at a suitable distance apart from those of the stationary vessel, the annular space thus formed between the walls of these vessels will be very soon filled up by the ring of liquid mentioned above. The lower parts of this ring do, however, not stand any longer under the hydrostatic pressure of a column of liquid, because the whole ring of liquid is kept in suspension by centrifugal force. This condition of a suspended volume of liquid can be utilized to great advantage in order to bring gases, air and the like in a fine divided condition for a longer period of time into intimate contact with said liquid. To this end the inner vessel is provided with a bottom through which the gases are introduced into the rotating vessel. The gases thus introduced enter the rotating ring of liquid, take part in the rotation of the latter and ascend in said liquid whereby each particle of gas describes a long spiral path, whereby two forces act upon each particle of gas, namely the rotating volume of liquid, as a horizontal force, and the upwardly directed force of the gas based on the small specific weight of the latter, as a vertical force. The resultant of these two forces represents the actual path taken by each particle of gas, *i. e.* the spiral.

In the accompanying drawing:— Figure 1 is an elevation of a device employed to put my invention into practice, partly shown in section. Fig. 2 is an elevation of a modification of the stationary vessel.

The vessel 1 destined for the reception of the liquid is rotatably arranged within the casing 2, whose bottom 3 is provided with a bearing 4 for the shaft 5, which bearing may either be secured to or cast integrally with the bottom 3 of the casing 2. The free end of the shaft 5 runs in the step-bearing 6 and the shaft itself is provided with a driving-pulley 7. The rim of the vessel 1 is gradually flared outward to form a flange 8 which overlaps the top-edge of the casing 2. Near the top of the latter an annular space 9 is formed by the annular wall 10 and its bottom-part 11. The wall 10 also possesses an external flange 12 upon which the flange 13 of the stationary vessel 14 rests. The latter is centrally inserted into the vessel and its bottom shaped so as to form an inlet-pipe 15 for the gas, air and the like to be treated, which inlet-pipe is provided with a lateral branch-pipe 16. If now the vessel 1 is rotated and then the liquid introduced therein by way of the branch-pipe 16 and the inlet-pipe 15, the liquid will gradually rise under the influence of the centrifugal force until it completely fills the upper part of the annular space 17 formed by the walls of the two vessels. As soon as the suspended ring of liquid has been formed and is retained in this position by a right choice of revolutions of the vessel 1, gas, air or the like are introduced into the annular space 17 through the inlet-pipe 15 and enter said ring of liquid wherein the particles of gas will gradually rise in shape of bubbles on a long spiral path, as stated above. The particles of the gas which on their way through the liquid have not been absorbed or condensed by the latter will penetrate the top surface of the ring of liquid and then pass off as a washed or purified gas through the pipe 18 which either may form an integral part of the stationary vessel 14, as shown in Fig. 1, or may be secured thereto in any other suitable manner. The liquid which by chance or intentionally may pass over the flange 8 into the space 9 will escape through the pipe 19 and may thence be led to any desirable point. By a suitable choice of the number of revolutions the rotatable vessel executes per minute it is made possible to retain the ring of liquid in such a position that none of the liquid, or a smaller, or a greater part thereof can flow over the flange 8 into the annular space 9. If the friction of the liquid upon the more or less rough walls of the vessels should not suffice to cause a thorough mixing of the gases and the liquid, the outer wall of the stationary vessel 14 may be provided with projections in shape of pins 20, as shown in Fig. 1, or in shape of inclined blades 21, as shown in Fig. 2. The same effect would of course be attained when the outer vessel were arranged stationary and the inner vessel made to rotate.

The liquid employed for absorbing, condensing, purifying or washing purposes can be renewed at will, as it is only necessary to let a new volume of the liquid enter with these gases into the rotating vessel 1. By a suitable choice of revolutions of the rotating vessel it can be arranged to introduce a volume of fresh liquid into the rotating vessel which corresponds exactly with the volume of liquid which passes over the flange 8 into the space 9, as stated above. This is a very essential feature as by means of it, it is made possible, to regulate the time of contact between the gases and the liquid and thus allow to charge the liquid to a greater or lesser degree with certain gases.

I claim:—

1. The process for absorbing, condensing or purifying gases, consisting in providing a ring of liquid held in suspension by centrifugal force, and introducing the gases to be treated into said ring of liquid.

2. The process for absorbing, condensing or purifying gases, consisting in providing a rotating ring of liquid held in suspension by centrifugal force, introducing the gases to be treated into said rotating ring of liquid, and collecting and leading off the gases escaping through the top-surface of said rotating ring of liquid.

3. The process for absorbing, condensing or purifying gases, consisting in providing a ring of liquid held in suspension by centrifugal force, introducing the gases to be treated into said rotating ring of liquid, and renewing such parts of said rotating ring of liquid as are impregnated with gases and thrown off by centrifugal force.

4. The process for absorbing, condensing or purifying gases, consisting in providing a ring of liquid held in suspension by centrifugal force, introducing the gases to be treated into said rotating ring of liquid, renewing such parts of said rotating ring of liquid as are impregnated with gases and thrown off by centrifugal force, and collecting and leading off the particles of gas penetrating the upper surface of said ring of liquid.

In testimony whereof I have signed my name to this specification in the presence of two subscribing witnesses.

FRANZ BRANDENBURG.

Witnesses:
BESSIE F. DUNLAP,
LOUIS VANDORN.